(12) United States Patent
Kirkpatrick et al.

(10) Patent No.: US 8,123,865 B2
(45) Date of Patent: Feb. 28, 2012

(54) METHOD AND COMPOSITION FOR STARCH EXTRACTION AND MODIFICATION

(75) Inventors: Robin Duncan Kirkpatrick, Johannesburg (ZA); Nickolas Speakman, Chelmsford (GB)

(73) Assignee: GB International Ltd. (VG)

( * ) Notice: Subject to any disclaimer, the term of this patent is extended or adjusted under 35 U.S.C. 154(b) by 367 days.

(21) Appl. No.: 12/050,501

(22) Filed: Mar. 18, 2008

(65) Prior Publication Data

US 2008/0251067 A1 Oct. 16, 2008

Related U.S. Application Data

(60) Provisional application No. 60/895,558, filed on Mar. 19, 2007.

(51) Int. Cl.
    *C08B 30/00* (2006.01)
(52) U.S. Cl. ......................................................... 127/65
(58) Field of Classification Search .................. 127/65
    See application file for complete search history.

(56) References Cited

U.S. PATENT DOCUMENTS

| | | | |
|---|---|---|---|
| 3,616,355 A | 10/1971 | Themy et al. | |
| 3,819,329 A | 6/1974 | Kaestner et al. | |
| 3,996,386 A | 12/1976 | Malkki et al. | |
| 4,042,414 A * | 8/1977 | Goering et al. | 127/32 |
| 4,171,383 A * | 10/1979 | Chwalek et al. | 426/623 |
| 4,238,243 A * | 12/1980 | Tu et al. | 502/64 |
| 5,049,397 A | 9/1991 | Kolbeck et al. | |
| 5,089,607 A | 2/1992 | Boni et al. | |
| 5,427,667 A | 6/1995 | Bakkhir et al. | |
| 5,540,819 A | 7/1996 | Bakhir et al. | |
| 5,628,888 A | 5/1997 | Bakhir et al. | |
| 5,635,040 A | 6/1997 | Bakhir et al. | |
| 5,674,537 A | 10/1997 | Morrow | |
| 5,871,623 A | 2/1999 | Bakhir et al. | |
| 5,902,619 A | 5/1999 | Rubow et al. | |
| 5,932,171 A | 8/1999 | Malchesky | |
| 5,985,110 A | 11/1999 | Bakhir et al. | |
| 6,103,286 A | 8/2000 | Gutzmann et al. | |
| 6,326,048 B1 | 12/2001 | Kato et al. | |

(Continued)

FOREIGN PATENT DOCUMENTS

BR PI 9201704 A 3/1993

(Continued)

OTHER PUBLICATIONS

Black et al., "Seed Biology: Advances and Applications," Science, (2000).*

(Continued)

*Primary Examiner* — Keith Hendricks
*Assistant Examiner* — Eli Mekhlin
(74) *Attorney, Agent, or Firm* — Fellers, Snider, Blankenship, Bailey & Tippens, P.C.; Dennis D. Brown

(57) ABSTRACT

A method of starch extraction, starch modification, and/or malting comprising (a) steeping a starch source in the presence of an aqueous anolyte product, (b) adding an aqueous anolyte product to an intermediate product extraction slurry comprising starch and gluten, (c) adding an aqueous anolyte product to a starch product slurry produced by separating the starch and gluten, (d) contacting an extracted starch product with a type and amount of an aqueous anolyte product effective for modifying the starch product and/or (e) steeping the starch source in the presence of an aqueous catholyte product.

19 Claims, 3 Drawing Sheets

U.S. PATENT DOCUMENTS

| | | |
|---|---|---|
| 6,610,249 B1 | 8/2003 | Hinze |
| 6,623,695 B2 | 9/2003 | Malchesky et al. |
| 7,090,753 B2 | 8/2006 | Sumita |
| 2002/0113017 A1 | 8/2002 | Sheets |
| 2004/0232007 A1 | 11/2004 | Carson et al. |

FOREIGN PATENT DOCUMENTS

| | | |
|---|---|---|
| EP | 0 858743 A2 | 8/1998 |
| EP | 0842122 | 8/2000 |
| JP | 7-328628 | 12/1995 |
| RU | 2 181 544 C2 | 4/2002 |
| RU | 2189217 C1 * | 9/2002 |
| RU | 2 195 125 C2 | 12/2002 |
| RU | 2195125 C2 * | 12/2002 |
| RU | 2 203 936 C2 | 5/2003 |
| RU | 2 262 851 | 10/2005 |
| RU | 2 262 852 | 10/2005 |
| WO | WO 9920287 | 4/1999 |
| WO | WO 9828238 | 6/1999 |
| WO | WO 2008084407 A2 | 7/2008 |

OTHER PUBLICATIONS

Kroschwitz J. I., et al. (Eds.), Kirk-Othmer, "Encyclopedia of Chemical Technology—Electrochemical Processing", 1994, pp. 124-141, vol. 9, Publisher: John Wiley & Sons, Published in: US.

Shirahata, et al., "Electrolyzed-Reduced Water Scavenges Active Oxygen Species and Protects DNA From Oxidative Damage", Mar. 21, 1997, pp. 269-274, No. 234, Publisher: Biochemical and Biophysical Research Communications, Published in: US.

Tatsuo et al., "Apparatus for water treatment by electrolysis", Dec. 19, 1995, Published in: Japan.

Straw et al., "Interactions of management and animal performance in a swine feed", 1985.

Tubbs, "Controlling coccidiosis in neonatal pigs", 1988.

Mukherjee, "Occurrence of *Escherichia coli*, Newcastle disease virus and infections bursal disease virus in broilers", 1994.

Sizikov, "Disinfecting soln. of use in hospitals, etc.".

Fraser, C.M., et al., "The Merck Veterinary Manuarl", 1991, pp. 190, 1529-1531, Publisher: Merck & Co., Inc., Published in: N.J.

Skaliy, et al., "Laboratory Studies of Disinfectants Against *Legionella pneumophila*", Oct. 1980, pp. 697-700, vol. 40, No. 4, Publisher: Applied and Environmental Microbiology, Published in: US.

Khrapenkov, et al, "Effect of Electrochemically Activated Systems on Malt Enzymes", 2002, Publisher: Pivo i Napiki, Issue 5, whole article.

PCT/IB08/02350, International Search Report and Written Opinion, Jul. 29, 2009.

* cited by examiner

METHOD AND COMPOSITION FOR STARCH EXTRACTION AND MODIFICATION

This application claims the benefit of U.S. Provisional Patent Application Ser. No. 60/895,558, filed on Mar. 19, 2007, the disclosure of which is incorporated herein by reference as if fully set out at this point.

FIELD OF THE INVENTION

This invention relates to methods of treating starch-based products during processing in the industrial starch separation and extraction industry for achieving optimal microbial decontamination, starch extraction and modification.

BACKGROUND OF THE INVENTION

Starch extraction and modification from raw grain and tuber products is one of the biggest markets in the food, animal feed and industrial starch industries internationally. Each day, thousands of tonnes of starch-based products are processed to extract the starch from it, before converting it to a variety of starch powders, premixes, pastes or liquids for use, inter alia, in beer production, meat and fish products, confectionery, jams and preserves, syrups, paper and cardboard manufacturing, animal and aqua feeds, pet food and many other related applications.

Production of the diverse range of starch-based products requires dedicated adherence to prescribed manufacturing procedures, which often include interventions with substantially noxious and potentially caustic chemical agents for specific manipulation of the molecular features and characteristics of both in-process and end-product starch molecules. These interventions are specifically designed to result in the production of different end products with highly specific and differentiated molecular configurations, which then confer specific and predictable performance when combined in further manufacturing procedures.

These chemical interventions include biocidal remedies to restrict the presence of pathogenic and spoilage micro-organisms which directly impact on the biosecurity of the product produced and thus the capacity to comply with internal as well as customer batch specifications. Optimal decontamination of these starch-based products is a critical factor in determining final product quality, not only from an economic perspective, but particularly from a human and animal safety perspective.

For purposes of this specification, the terms "starch source" or "starch-based products" should be interpreted to include tubers (e.g. potatoes), grains, tapioca and derivative products (e.g. partially processed grains). "Grains" should be interpreted to include nuts, oil seeds, barley, wheat, maize (e.g. waxy and high amylose maize), rye, oats, corn and grains of any other cereal crops from which starch can be extracted.

Industrial Treatment of Starch-Based Products

Industrial starch production encompasses a diverse array of processing procedures for an extensive variety of starch types, all geared towards the production of either pure or derivative starch based products which have been tailored to specific applications and inclusions.

In the grain malting industry, graded barley grains undergo repeated immersion in steep water to increase moisture content from approximately 14% to around 45%. Germination of the embryo within the barley kernel is initiated at around 35% moisture content and the moistened grain is "germinated" for up to 6 days to form what is known as 'green malt'. This process facilitates optimal enzymatic modification of the starch in the endosperm, but requires termination prior to the endosperm being converted into a starch source required for the developing roots and leaf shoots. Control of the process depends largely on the optimisation of the quality and quantity of the steeping water, the exclusion of overgrowth of microbial contaminants, and the maintenance of optimal temperature and humidity of the germinating grains during the development of the 'green malt'. Treatment of steep water with biocidal agents to preclude microbial growth and mycotoxin generation must be balanced against the potential adverse impact upon the germinating grains as well as the potential for chemical taint of the starch undergoing enzymatic modification. Thus, water quality remains a critical component for the efficient production of a fundamental ingredient in the brewing process.

In an industrial starch mill, a new shipment of starch-based products is first graded according to, inter alia, colour, size, level of superficial microbial and mycotoxin contamination, and moisture, oil and protein content, after which the starch-based products are weighed and cleaned in a preliminary first stage screening process to remove dust, chaff and foreign materials. The starch-based products are subsequently conveyed to steeping vessels where they undergo steeping in lukewarm steepwater, essentially to permit optimal germ extraction and mobilisation of the endosperm. During steeping these grain products absorb water, which results in softening of the grain husks and an elevation of the moisture level and size of the kernels.

Sulfur dioxide ($SO_2$) is generally added to the steepwater to prevent excessive bacterial growth in this warm environment. The mild acidity of the steepwater also begins to loosen gluten bonds within the starch-based products, thereby initiating the mobilising of the starch molecules.

The softened husks are removed and the grain is coarsely ground to break the grain germ, also known as the embryo, loose from other components, such as the endosperm and fiber. The ground grain is carried in a water slurry to cyclone germ separators where the low density germ is spun out of the slurry and retained for further processing, e.g. extraction of oils, while the germ residue may be used in animal feeds.

The starch-based products undergo a second, more severe grinding stage to release the starch and gluten from the fiber in the kernel. The starch and gluten, which is now referred to as "mill starch", is separated from the fiber and conveyed to starch separators, while the fiber may be treated further for use in animal feeds. The mill starch slurry is passed through a separator, such as a centrifuge, to separate the low density gluten from the starch. The gluten may be used in animal feeds. The starch slurry is diluted and repeatedly washed to remove any remaining protein traces. The starch slurry is then dried to about 12% moisture content and either (i) sold as unmodified starch; (ii) converted into syrups and dextrose; or (iii) chemically modified into specialty starches by applying different reagents, heat and pressure to change the properties of the unmodified starch.

One of the difficulties associated with starch separation processes concerns the addition of $SO_2$ to the steepwater during conditioning. Although $SO_2$ may be a good bacteriostat, it is harmful to humans and can result in severe respiratory conditions. Accordingly, special precautionary measures are required in starch processing facilities to provide for the step of $SO_2$ addition. Also, microbial contaminants tend to become tolerant after exposure to continuously consistent levels of $SO_2$, which may decrease the antimicrobial efficacy of $SO_2$ over time. Finally, $SO_2$ may also impart an adverse colour taint to the intermediate and final product, thus requiring an intervention with potent oxidising agents to both neutralise its activity as well as to diminish the associated colour taint.

Moreover, after steeping, it is necessary to eliminate any traces of $SO_2$ before further processing of the starch slurry, especially where it is intended for human or animal consumption applications. This is usually done by adding an oxidant, notably a peroxide composition such as benzoyl peroxide, to the mill starch slurry for neutralisation of the sulfur dioxide.

However, peroxide is an expensive chemical, which increases production costs. In addition, peroxide is highly corrosive in nature, which not only damages process equipment over time, but also complicates material handling protocols in a starch separation process. Moreover, once peroxide is added to the mill starch, any bacteriostatic efficacy of $SO_2$ is eliminated, hence creating substantial opportunity for microbial and specifically fungal proliferation and consequential spoilage with an increased potential for mycotoxin generation during downstream processing of the mill starch slurry.

One of the ways in which to modify starches chemically involves reducing the size of a starch polymer through oxidation. This is achieved by mixing sodium hypochlorite (NaOCl) into a starch slurry. Sodium hypochlorite cleaves the complex linkages within a starch polymer, as well as the carbon-to-carbon bonds in a dextrose molecule, to produce large carboxyl and carbonyl groups. These groups reduce the tendency of starch to retrograde, give the starch a stickiness that is beneficial for coating foods and in batters, and make the starches more stable.

Electrochemically Activated Aqueous Compositions

It is well known that production of electrochemically activated (ECA) solutions from diluted dissociative salt solutions involves passing an electrical current through an electrolyte solution in order to produce separable catholyte and anolyte solutions. Those who are engaged in the industry will appreciate that catholyte, which is the solution exiting the cathodal chamber, is an anti-oxidant and normally has a pH in the range of from about 8 to about 13, and an oxidation-reduction (redox) potential (ORP) in the range of from about $^-200$ mV to about $^-1100$ mV. The anolyte, which is the solution exiting the anodal chamber, is an oxidant and is generally an acidic solution with a pH in the range from about of between 2 and to about 8, an ORP in the range of from about $^+300$ mV to about $^+1200$ mV, and a Free Active Oxidant concentration of $\leq 300$ ppm.

During electrochemical activation of aqueous electrolyte solutions, various oxidative and reductive species are present in solution, for example HOCl (hypochlorous acid); $ClO_2$ (chlorine dioxide); $ClO_2^-$ (chlorite); $ClO_3^-$ (chlorate); $ClO_4^-$ (perchlorate); $OCl^-$ (hypochlorite); $Cl_2$ (chlorine); $O_2$ (oxygen); $H_2O_2$ (hydrogen peroxide); $OH^-$ (hydroxyl); and $H_2$ (hydrogen). The presence or absence of any particular reactive species in solution is predominantly influenced by the derivative salt and the final solution pH. So, for example, at pH 3 or below, HOCl converts to $Cl_2$, which increases toxicity levels. At pH below 5, low chloride concentrations produce HOCl, but high chloride concentrations will produce $Cl_2$ gas. At pH above 7.5, hypochlorite ions ($OCl^-$) are the dominant species. At pH>9, the oxidants (chlorites, hypochlorites) convert to non-oxidants (chloride, chlorates and perchlorates) and active chlorine (i.e. defined as $Cl_2$, HOCl and $ClO^-$) is lost due to the conversion to chlorate ($ClO_3^-$). At a pH of 4.5-7.5, the predominant species are HOCl (hypochlorous acid), $O_3$ (ozone), $O_2^{2-}$ (peroxide ions) and $O^{2-}$ (superoxide ions).

For this reason, anolyte predominantly comprises species such as ClO; $ClO^-$; HOCl; $OH^-$; $HO_2$; $H_2O_2$; $O_3$; $S_2O_8^{2-}$ and $Cl_2O_6^{2-}$, while catholyte predominantly comprises species such as NaOH; KOH; $Ca(OH)_2$; $Mg(OH)_2$; $HO^-$; $H_3O_2^-$; $HO_2^-$; $H_2O_2^-$; $O_2^-$; $OH^-$ and $O_2^{2-}$. The order of oxidizing power of these species is: HOCl (strongest)>$Cl_2$>$OCl^-$ (least powerful). For this reason anolyte has a much higher antimicrobial and disinfectant efficacy in comparison to that of catholyte or commercially available stabilized chlorine formulations when used at the recommended dosage rates.

SUMMARY OF THE INVENTION

The present invention satisfies the needs and alleviates the problems discussed above. In one aspect, there is provided a method of extracting a starch product from a starch source comprising the steps of: (a) steeping the starch source in a steeping liquid and then (b) extracting the starch product from the starch source. The steeping liquid comprises an aqueous anolyte product having a pH in the range of from about 4.5 to about 7.5 and a positive oxidation-reduction potential of at least $^+650$ mV. The steeping liquid further comprises non-electrochemically activated water. The aqueous anolyte product is present in the steeping liquid in an amount in the range of from about 1% to about 50% by volume.

Examples of starch sources include, but are not limited to: grain products; tuber products; tapioca; nut products; seed products; derivatives of grain, tuber, tapioca, nut or seed products; and combinations thereof.

In another aspect, there is provided a method of extracting a starch product from a starch source comprising the steps of: (a) steeping the starch source; (b) after step (a), producing from the starch source an intermediate product slurry comprising starch and gluten; and (c) after step (b), at least partially separating the starch and the gluten to produce a starch slurry comprising the starch product. The method further comprises adding an aqueous anolyte product to the intermediate product slurry to produce a treated intermediate slurry, the aqueous anolyte product having, when in undiluted form, a pH in the range of from about 4.5 to about 7.5 and a positive oxidation-reduction potential of at least $^+650$ mV. This method can also optionally further comprise treating the starch source with sulfur dioxide in step (a). The anolyte is preferably added to the intermediate product slurry in a total amount effective to comprise from about 1% to about 20% by volume of the treated intermediate slurry. In addition, the aqueous anolyte product, when in undiluted form, most preferably has a pH of at least 6.0 and a positive oxidation-reduction potation of at least $^+900$ mV.

In another aspect, there is provided a method of extracting a starch product from a starch source comprising the steps of: (a) steeping the starch source; (b) after step (a), producing from the starch source an intermediate product slurry comprising starch and gluten; and (c) after step (b), at least partially separating the starch and the gluten to produce a starch slurry comprising the starch product. The method further comprises adding an aqueous anolyte product to the starch slurry to produce a treated starch slurry, the aqueous anolyte product having, when in undiluted form, a pH in the range of from about 4.5 to about 7.5 and a positive-reduction potential of at least $^+650$ mV.

In another aspect, there is provided a method of starch extraction comprising (i) producing from a starch source an intermediate product slurry comprising starch and gluten and then (ii) at least partially separating the starch and the gluten to produce a starch slurry. The method further comprises the step of adding an aqueous anolyte product having a pH of at least 6.0 and a positive oxidation-reduction potential of at least $^+900$ mV to (a) the intermediate product slurry, (b) the starch slurry, or (c) to both of the intermediate product slurry and the starch slurry in a manner effective to cause the aqueous anolyte product to be present in the starch slurry in a final concentration in the range of from about 1% to about 35% by volume.

In another aspect, there is provided a method of bleaching a starch product which has been extracted from a starch source. The method comprises the step of contacting the starch product with an aqueous anolyte product having, when in undiluted form, a pH in the range of from about 2 to about 5 and a positive oxidation-reduction potential of at least $^{+}1000$ mV.

In another aspect, there is provided a method comprising the step, prior to steeping, of contacting a starch source with an aqueous catholyte product having, when in undiluted form, a pH in the range of from about 8 to about 13 and a negative oxidation-reduction potential of at least $^{-}700$ mV.

In another aspect, there is provided a method of modifying a starch product which has been extracted from a starch source. The method comprises the step of contacting the starch product with an aqueous anolyte product having, when in undiluted form, a pH in the range of from about 3.5 to about 7.5, a positive oxidation-reduction potential of at least $^{+}650$ mV and a Free Active Oxidant concentration of not more than 300 ppm. The starch product will preferably be contacted with the aqueous anolyte product in an amount and in a manner effective for causing the starch product to have an increased Xylose content. Alternatively, or in addition, the starch product can be contacted with the aqueous anolyte product in an amount and in a manner effective for causing at least some sucrose in the starch product to be broken down to form fructose and glucose. Further, the step of contacting the starch product with aqueous anolyte product can involve forming a dough mixture comprising the starch product and the aqueous anolyte product.

In another aspect, there is provided a method of malting barley comprising the step of germinating the barley in an aqueous steeping liquid comprising (i) an aqueous anolyte product having a pH in the range of from about 4.5 to about 7.5 and a positive oxidation-reduction potential of at least $^{+}650$ mV and (ii) non-electrochemically activated water. This method can also further comprise the step of steeping the barley in an aqueous catholyte product having, when in undiluted form, a pH of at least 10 and a negative oxidation-reduction potential of at least $^{-}900$ mV.

It is an object of the present invention to provide a new method of treating starch-based products during processing in the industrial starch separation and extraction industry to reduce the presence of superficial bacterial and fungal contaminants that may proliferate during steeping, and thereby to reduce the likelihood of new fungal contamination and thus mycotoxin production, while at the same time replacing biocides that are currently used e.g., sulfur dioxide ($SO_2$).

It is a further object of the invention to introduce a non-toxic remedy for in-process usage during treatment of starch-based products, comprising predominantly HOCl, which is substantially more effective at killing harmful pathogens than hypochlorite or molecular chlorine as may be produced with an Aquachlor device.

It is another object of the invention to provide a superficial method of treating starch-based products that will assist in reducing contamination of the extracted grain germ with spoilage microbes so as to improve keeping quality and limit constituent peroxidation, and thus generation of free fatty acids, which may contribute to rancidity of subsequently extracted oil products.

It is a further object of the invention to introduce a food-grade, aqueous-based biocide for in-process use during the treatment and production of starch-based products, more specifically for downstream control of surface microbial biofilm growth, this with a resultant reduction of recontamination from the same biofilm and associated spoilage and pathogenic microbes.

It is yet a further object of the invention to provide a method of treating starch-based products that will increase the percentage of pharmaceutical grade starch produced from food or industrial grade slurry, or alternatively to increase the percentage of food grade product produced from industrial grade starch slurry.

It is also an object of the invention to provide a method of treating starch-based products to modify starches chemically with an oxidant that exhibits higher oxidation efficiency than the currently used sodium hypochlorite.

It is yet another object of the invention to provide a method of mobilizing polymers of raw starch aggregate by cleaving complex covalent and hydrogen bonded molecular linkages, and thereby to modify the aggregate of starch polymers into highly specific and differentiated molecular configurations and thus commercial products, through a reduced reliance on complex and hazardous chemical interventions.

It is yet another object of the invention to provide a method and a solution for the enhanced antimicrobial biosecurity of intermediate starch based products which may be subjected to unplanned transient or extended in-process storage where unchecked microbial growth would adversely impact upon final product quality.

It is a further object of the invention to provide a method for the safe and effective decontamination of both steeping water and barley grain during a malting process, such method having an additional benefit of effecting a reliably synchronous germination of the barley grains, increasing germination yield per unit grain mass, and the consequent production of an optimally consistent percentage of enzymatically converted starch within the endosperm.

Further features, objects, and advantages of the present invention will be apparent to those of ordinary skill in the art upon examining the accompany figures and upon reading the following Detailed Description of the Preferred Embodiments.

DETAILED DESCRIPTION OF THE PREFERRED EMBODIMENTS

Figure 1:
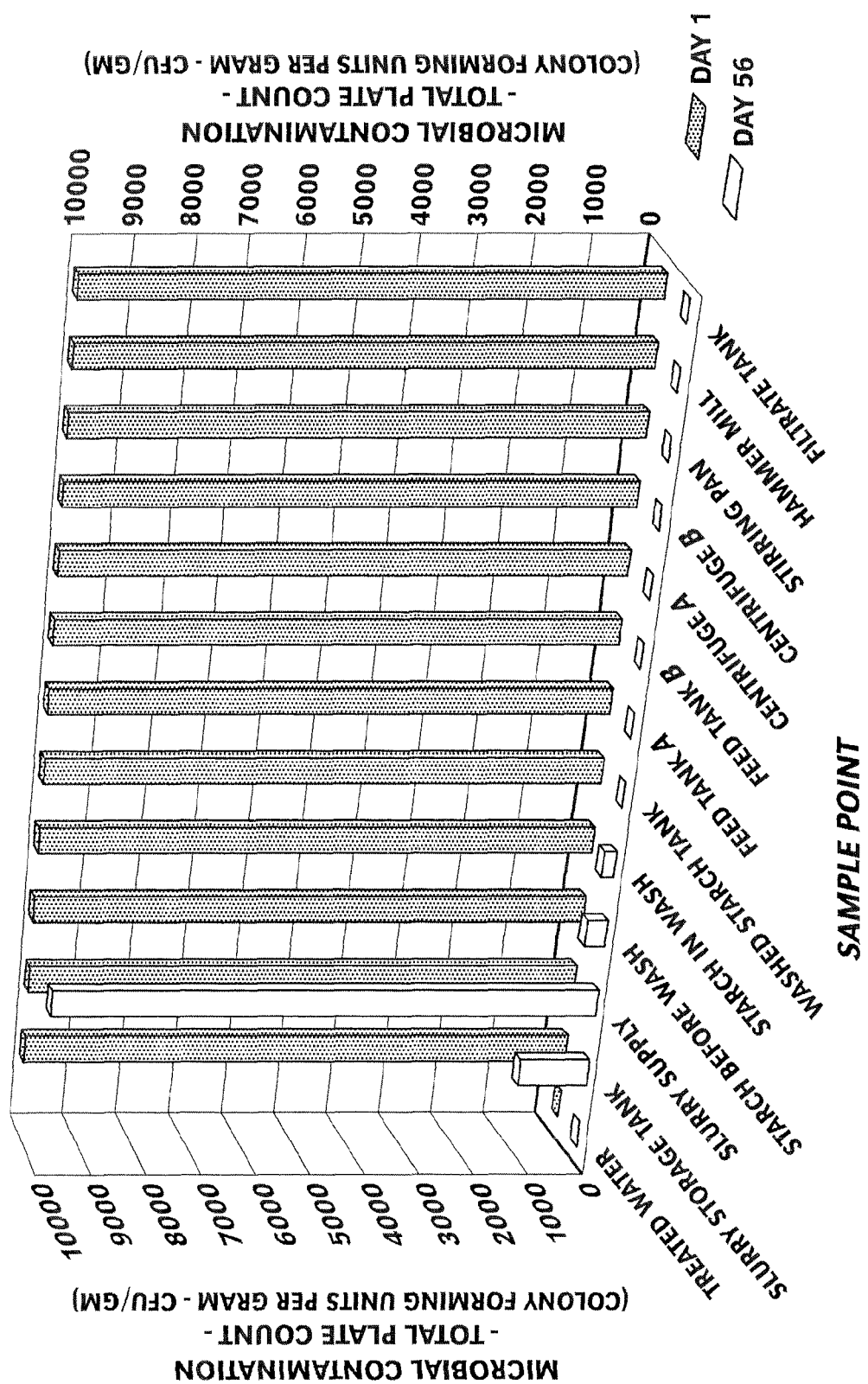
FIG. 1 is a chart showing reduction of microbial contamination of in-process starch in Example 1, using anolyte-treated process water.

According to the invention there is provided an in-process, real-time biocide intervention method and composition for treating grains and starch-based products during processing in the industrial starch separation and extraction industry, the method being capable of producing predominantly pharmaceutical grade starch and being characterized in one aspect that the starch-based products are brought into contact with an electrochemically activated aqueous anolyte solution with a pH in the range of from about 4.5 to about 7.5, an ORP in the range from about $^+$650 mV to $\geq^+$900 mV and a Free Active Oxidant concentration of $\leq$300 ppm, during steeping and beyond.

The anolyte once added to the various aqueous based phases of the process, will impart distinctive physiochemical attributes such as pH, electrical conductivity, ORP and Free Active Oxidant concentration. These parameters in turn reflect a direct causal relationship with antimicrobial efficacy based on an inverse relationship between microbial bioload and anolyte dilution applied. Thus, these parameters display a direct correlation to the quality of the aqueous phase being treated as well as the dilution at which the anolyte was added.

These parameters can be measured on a real-time basis so as to reliably predict the antimicrobial capacity of the treated aqueous phase.

The anolyte may be produced by electrochemically activating a dilute aqueous saline solution preferably comprising from about 1 to about 9 grams of salt per liter of water. The saline solution will more preferably comprise from about 2 to about 3 grams of salt per liter of water.

The salt will preferably be any inorganic salt. In particular, the salt will preferably be non-iodated sodium chloride (NaCl) or potassium chloride (KCl).

The method may include the step of on-site generation of the anolyte solution, comprising the steps of: electrochemically activating a dilute electrolyte solution in an electrochemical reactor comprising an anodal and a cathodal chamber and being capable of producing separable electrochemically activated aqueous anolyte and catholyte solutions; separately harvesting the catholyte solution; and reintroducing the catholyte solution into the anodal chamber in the absence of any fresh water; and manipulating the flow rate, hydraulic flow configuration and regimen, pressure and temperature of the catholyte through the anodal chamber, so as to produce a preferred anolyte solution that is characterized therein that it predominantly includes the species HOCl (hypochlorous acid), $O_3$ (ozone), $O_2^{2-}$ (peroxide ions) and $O_{2-}$ (superoxide ions), and has a Free Active Oxidant concentration of $\leq$1000 ppm but preferably in the range of from about 100 to about 500 ppm.

The pH of the anolyte will preferably be in the range of from about 5.5 to about 7.

The method may provide for introducing the anolyte into process steepwater. The anolyte may be introduced into the steepwater at a concentration of up to 50% by volume. Preferably, the anolyte will be introduced into the steepwater at a concentration of less than 20% in corn or maize steeping solutions, and less than 35% in tuber and other grain steeping solutions.

The method may provide for the continuous and/or episodic interventions at single and/or multiple aspects for the treatment of the process water so as to comply with the maintenance of the Oxidation-Reduction Potential (ORP) of the same, this to ensure that the predictive relationship between the minimum microbiocidal and measured oxidant reactivity of the process water is maintained.

The method may include a further step of selectively administering anti-oxidant electrochemically activated aqueous catholyte solution as a pre-steeping wash for superficial mycotoxin neutralization, the catholyte preferably having a pH in the range of from about 8 to about 13, and a negative ORP of more than or equal to $^-$700 mV (preferably an ORP in the range of from about $^-$700 mV to about $^-$1000 mV) for a period of exposure that is commensurate with the degree of mycotoxin elimination required and which is tolerated during commercial scale detoxification appropriate to the industry sector.

The anolyte may be introduced at a temperature as per standard operating conditions. The anolyte will preferably be introduced at a temperature in the range of from about 5° C. to about 45° C.

The method may include the further step of bleaching the separated starch by washing it in an acidic anolyte with a pH in the range of from about 2 to about 5 and an ORP of $\geq$1000 mV. This distinctive anolyte solution could be applied at any appropriate treatment point after the starch slurry has undergone separation from the raw fiber, gluten and other non-starch components in the "wet mill". The treatment points would typically comprise bulk holding, transfer vessels or allied reticulation systems prior to further manipulation and/or dehydration, spray and flash drying.

The method also may include the further step of selectively adding anolyte with a pH in the range of from about 6.0 to about 6.5, an ORP of $\geq^+$950 mV, and a Free Active Oxidant concentration $\leq$300 ppm to mill starch slurry during downstream processing of the same, as well as to the final extracted starch component, so as continuously to neutralize residual microbial contaminants, as well as to effect a residual disinfection of downstream process equipment for control of potentially recontaminating biofilm growth. The anolyte may be introduced into the mill starch slurry or the final extracted starch component at a concentration of up to 20% by volume. The points of application in the overall process flow will preferably correspond with the targeted microbe biocide contact period as described by the minimum dwell time within the process, itself correlated with the magnitude of anolyte dilution and the minimum levels of microbial decontamination required within the treated starch slurry, this prior to it undergoing further processing and/or dehydration, spray and flash drying.

Typically, large volume batch sizes would require extended processing time and thus protracted storage periods without the bacteriostatic benefits of sulfur dioxide or equivalent agents which would have been neutralised at the time of transfer from the wet mill. Thus the treatment of these slurry types with anolyte immediately after $SO_2$ or equivalent neutralisation, would be optimal for maintaining a non-tainting, and residual, aqueous based biocidal capacity and capability where optimal microbial control under extended storage periods for the starch slurry may be required.

The invention also extends to the use of electrochemically activated aqueous anolyte solution as a steeping agent during a starch-separation and extraction process, comprising the step of bringing the starch-based products into contact with an anolyte solution with a pH in the range of from about 4.5 to about 7.5 and an ORP in the range of from about $^+$650 mV to $\geq^+$900 mV, by introducing the anolyte into process water.

The invention further includes an electrochemically activated aqueous anolyte solution with a pH in the range of from about 4.5 to about 7.5 and an ORP in the range of from about $^+$650 mV to $\geq^+$900 mV for use as a treatment agent added to the process water used during the steeping and modification of the starch-based products.

The invention also extends to the use of an electrochemically activated aqueous anolyte solution as an oxidant for use in starch modification processes to cleave covalent and hydrogen bonded starch polymer linkages in the aggregate starch molecule, the use comprising the step of bringing an unmodified extracted starch component into contact with an anolyte solution with a pH in the range of from about 3.5 to about 7.5, an ORP in the range of from about $^+$650 mV to $\geq^+$900 mV and a Free Active Oxidant concentration of ≦300 ppm. This heightened capacity to cleave starch polymer bonds is reflected by an increase in the levels of short chain length starch molecules and an equivalent reduction in the viscosity of the anolyte treated starches. These strategic interventions may also employ further increased temperature manipulation to optimize the degree of starch polymer disruption and the equivalent measure of viscosity change.

The invention also includes an electrochemically activated aqueous anolyte solution with a pH in the range of from about 4.5 to about 7.5, an ORP in the range of from about $^+$650 mV to ≧$^+$900 mV, and a Free Active Oxidant concentration of ≦300 ppm, for use as an oxidant during starch modification processes.

The invention includes an electrochemically activated aqueous anolyte solution with a pH in the range of from about 4.5 to about 7.5, an ORP in the range of from about $^+$650 mV to ≧$^+$900 mV, and a Free Active Oxidant concentration≦300 ppm, for use as a treatment agent of process water for the steeping and germination of barley grains during a malting process.

Without limiting the scope thereof, the invention will now further be described and exemplified with reference to the following examples and experimental results.

EXAMPLE 1

Electrochemically activated aqueous solutions were generated on-site at a commercial maize or corn-based starch processing mill. An electrochemically activated aqueous anolyte solution with a pH of 6.5, an ORP of ≧$^+$900 mV and a Free Active Oxidant concentration of ≦300 ppm was added into the mill starch slurry upon transfer from the "wet mill" to the final modification and drying infrastructure. The anolyte was added at strategic intervention points along various progressive aspects of the final product modification and dehydration process flow. These intervention points comprised but were not restricted to the starch slurry transfer tanks, the washed starch tanks, the centrifuge transfer tanks, relieved and equivalent centrifuges, centrifuge backwash tanks, countercurrent differential extraction cyclones (Dorrclones), vent boxes, Merco centrifuges and underflow and filtrate tanks. Anolyte was added at a final volumetric inclusion rate of 1% to 2% by volume per total resulting volume at the level of the starch transfer tank immediately after neutralization of sulfur dioxide ($SO_2$), at ≦10% by volume per total resulting volume at the wash starch tanks, and at a rate of ≦35% by volume per total resulting volume in the counter-current extraction cyclones. This equates to a Free Active Oxidant concentration of between 1 and 300 ppm, but preferably a level between 1 and 60 ppm at each of the respective intervention points. In addition, catholyte solutions with a pH of ≦11.0 and a negative ORP of more than or equal to $^-$800 mV (preferably an ORP in the range of $^-$800 mV to about $^-$1000 mV) were used for the mobilization of general organic soiling as well as biofilm removal and general surface cleaning as well as selective pH and anti-oxidant starch manipulation.

TABLE 1

Microbial in-process starch department: Anolyte trials (immediately prior to beginning treatment):

| Sample point | TPC cfu/g | Yeast Cfu/g | Moulds cfu/g | Other |
|---|---|---|---|---|
| Slurry from milling | — | — | — | — |
| Slurry storage tank I | >10000 | >10000 | <10 | Bacillus |
| DC Slurry supply tank | >10000 | >10000 | <10 | Bacillus, NFC |
| Starch pre-DC | >10000 | >10000 | <10 | Bacillus, Yeast |
| Starch from the DC | >10000 | >10000 | <10 | Bacillus, Yeast |
| DC wash water supply Tank | 1 | 0 | 0 | No growth |
| Washed starch tank | >10000 | >10000 | <10 | Bacillus, NFC, Yeasts |
| Feed tank A | >10000 | >10000 | <10 | Bacillus, NFC, Yeasts |
| Feed tank B | >10000 | >10000 | <10 | Bacillus, NFC, Yeasts |
| Reineveld A | >10000 | >10000 | <10 | Bacillus, NFC, Yeasts |
| Reineveld B | >10000 | >10000 | <10 | Yeasts, NFC |
| Stirring Pan | >10000 | >10000 | <10 | Yeasts, NFC |
| Hammer mill inlet/supply | >10000 | 3840 | <10 | Yeasts, NFC |
| Filtrate tank | >10000 | >10000 | <10 | Yeasts, NFC |

Legend:
TPC—Total Plate Count,
cfu/gm—colony forming units per gram.

TABLE 2

In-process anolyte dosing (5 hours later):

| Sample point | TPC cfu/s | Yeast cfu/g | Moulds cfu/g | Other |
|---|---|---|---|---|
| Slurry from milling | — | — | — | — |
| Slurry storage tank 1 | 3360 | 4160 | <10 | Bacillus |
| DC Slurry supply tank | 2160 | 2880 | <10 | Bacillus, Yeast |
| Starch pre-DC | 2650 | 3200 | <10 | Bacillus, Yeast |
| Starch from the DC | 1120 | 560 | <10 | Bacillus, Yeast |
| DC wash water supply tank | 0 | 0 | 0 | no growth |
| Washed starch tank | 320 | 10 | <10 | Bacillus, Yeast |
| Feed tank A | 1520 | 1920 | <10 | Bacillus, NFC |
| Feed tank B | 3040 | 4080 | <10 | Bacillus, NFC |
| Reineveld A | 560 | 360 | <10 | Bacillus |
| Reineveld B | 6720 | >10000 | <10 | Bacillus, NFC |
| Stirring Pan | 1200 | 1040 | <10 | Bacillus, NFC |
| Hammer mill inlet/supply | 50 | <10 | <10 | Bacillus |
| Filtrate tank | 2560 | 3360 | <10 | Bacillus, NFC |

Legend:
TPC—Total Plate Count,
cfu/gm—colony forming units per gram.

TABLE 3

End of batch specifications: (3 days later)

| Sample point | TPC cfu/g | Yeast cfu/g | Moulds cfu/g | Other |
|---|---|---|---|---|
| Slurry from milling | 410 | <10 | <10 | Bacillus |
| Slurry storage Tank I | — | — | — | — |
| DC Slurry supply tank | — | — | — | — |
| Starch pre-DC | — | — | — | — |
| Starch from the DC | — | — | — | — |
| DC wash water supply tank | — | — | — | — |
| Washed starch tank | 10 | <10 | <10 | Bacillus, Yeasts |
| Feed tank A | — | — | — | — |
| Feed tank B | 300 | 100 | <10 | Bacillus |
| Reineveld A | — | — | — | — |
| Reineveld B | <10 | <10 | <10 | Bacillus |

TABLE 3-continued

End of batch specifications: (3 days later)

| Sample point | TPC cfu/g | Yeast cfu/g | Moulds cfu/g | Other |
|---|---|---|---|---|
| Stirring Pan | 30 | <10 | <10 | Bacillus |
| Hammer mill inlet/supply | 10 | <10 | <10 | Bacillus |
| Filtrate tank | >10000 | >10000 | 10 | Bacillus, NFC, Yeasts |

Continuous administration of anolyte into the starch slurry results in a progressive reduction in the level of microbial contaminants throughout the downstream intermediate and final starch products. Additionally, intervention with the catholyte solutions substantially contributed to the continuous control of cross and recontamination of in-process starch products

EXAMPLE 2

Impact of an Integrated Addition of Electrochemically Activated Anolyte Solution on the Microbial Bioload of Intermediate Starch Products, when Applied Throughout the Process Infrastructure in a Maize Based Starch Milling Plant Anolyte solutions having an ORP of ≧850 mV, a pH of 6.7, and a Free Active Oxidant concentration of ≦300 ppm were applied, in various volumetric dilutions ranging from 1 to 50 volume %, to the in-process mill starch slurry as a means to progressively decontaminate intermediate and final starch products, as well as to remove residual recontaminating biofilm from downstream process surfaces of the maize or corn starch mill equipment infrastructure.

FIG. 1 provides a graphic representation of the anolyte antimicrobial efficacy results showing the significant reduction of microbial contaminants between the two sampling days (Day 1 and Day 56), as well as the consequential reduction in microbial contamination when the anolyte was added to the slurry after the point of supply from the wet mill. This effect was consistently associated with the strategic intervention with Anolyte throughout the overall process flow.

EXAMPLE 3

Anolyte in the Equivalent Dilutions and at the Prescribed Intervention Points as Detailed in Example 1, was Added to Starch Mill Slurry and the Final Commercial Product was Assessed for Compliance with Internal Microbial Specifications

TABLE 4

Anolyte trials 03 June: Modified starch

| Batch no | TPC cfu/g | Yeasts | Moulds | Other | Grade |
|---|---|---|---|---|---|
| M3669 | 90 | 20 | <10 | BACILLUS, NFC | FOOD |
| M3670 | 1400 | 740 | <10 | BACILLUS, NFC | FAIL |
| M3671 | 2640 | 360 | <10 | BACILLUS, NFC | FOOD |
| M3672 | 210 | 90 | <10 | BACILLUS, NFC | FOOD |

Legend:
TPC—Total Plate Count,
cfu/gm—colony forming units per gram.

TABLE 5

Anolyte trials 07 June: Modified Starch

| Batch no | TPC cfu/g | Yeasts | Moulds | Other | Grade |
|---|---|---|---|---|---|
| M3681 | 180 | 30 | <10 | BACILLUS | FOOD |
| M3682 | 130 | 20 | 40 | BACILLUS | FOOD |
| M3685 | 60 | <10 | 10 | BACILLUS | FOOD |

Legend:
TPC—Total Plate Count,
cfu/gm—colony forming units per gram.

TABLE 6

Anolyte treatment: White low moisture starch

| Production rate | TPC cfu/g | Yeasts | Moulds | Other | Grade |
|---|---|---|---|---|---|
| 28/Sept. | 40 | <10 | <10 | Bacillus | Pass - pharma grade |
| 28/Sept. | 30 | <10 | <10 | Bacillus | Pass - pharma grade |
| 30/Sept. | 20 | <10 | <10 | Bacillus | Pass - pharma grade |
| 30/Sept. | 40 | <10 | <10 | Bacillus | Pass - pharma grade |
| 30/Sept. | 30 | <10 | 10 | Bacillus | Pass - pharma grade |
| 01/Oct. | 310 | 20 | 10 | Bacillus | Pass - pharma grade |
| 01/Oct. | 480 | <10 | <10 | Bacillus | Pass - pharma grade |
| 02/Oct. | 290 | <10 | <10 | Bacillus | Pass - pharma grade |
| 03/Oct. | 10 | <10 | <10 | Bacillus | Pass - pharma grade |

Legend:
TPC—Total Plate Count,
cfu/gm—colony forming units per gram.

Results

Consistent and continuous addition of anolyte solutions to in-process mill starch slurry results in a progressive reduction of microbial contamination of finished product, with a reliable and predictable attainment of the highest grade of commercial product based on the level of microbial contaminants.

EXAMPLE 4

Correlation Between Changes in ORP (Oxidation Reduction Potential), pH and Electrical Conductivity Measurements as a Result of Progressive Dilution, and Antimicrobial Efficacy Anolyte was generated from two different salt types i.e. Sodium Chloride and Sodium Bicarbonate (ORP≧$^-$900 mV and pH 7±0.5) and was diluted with a variety of tap water, distilled water and deionized water. The ORP was measured with a commercial REDOX probe that had been calibrated against a commercial reference solution of 475 mV. (Eutech instruments—Singapore)

Figure 2:
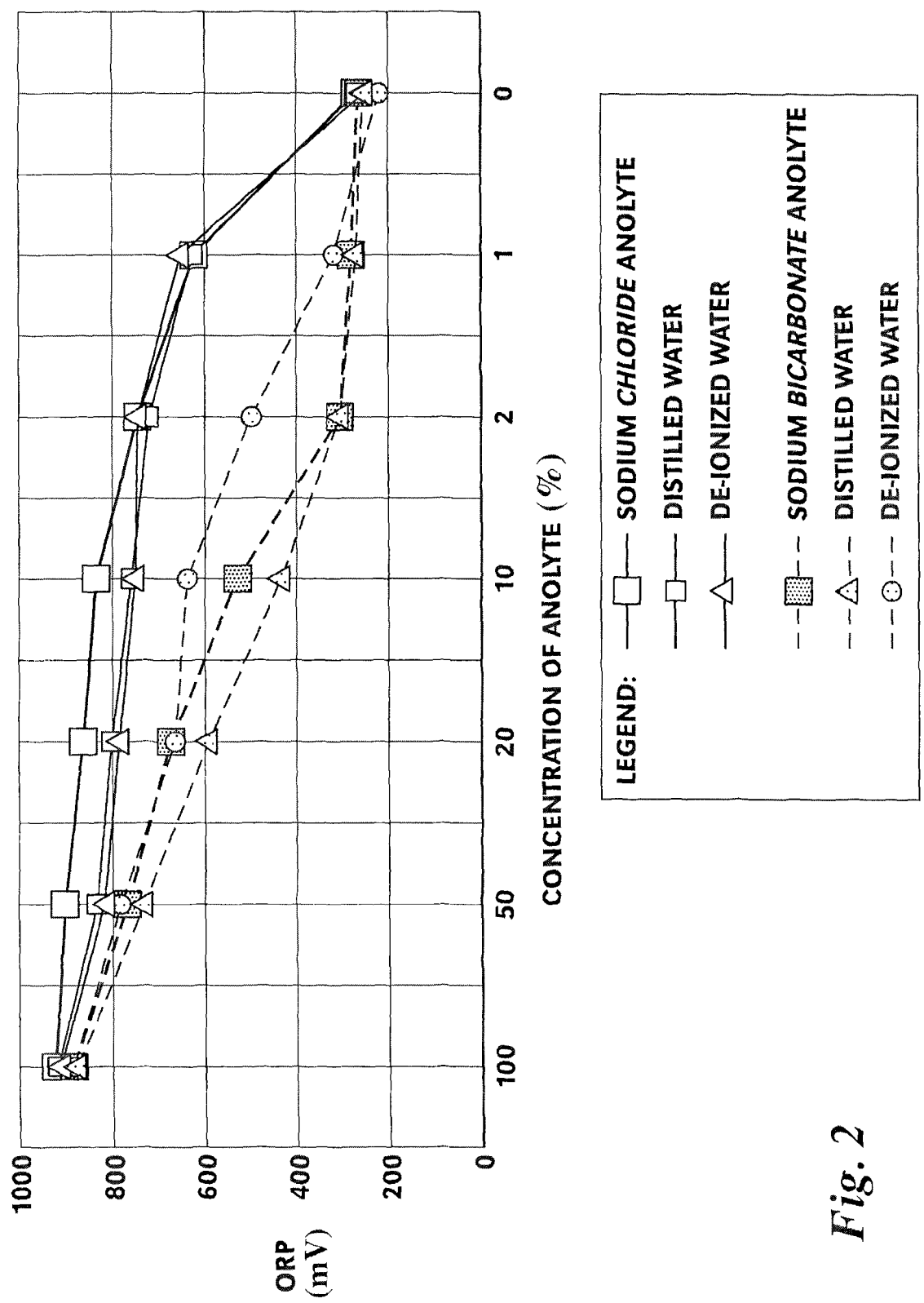
FIG. 2 is a chart showing changes in the oxidation-reduction potential (ORP) of anolyte solutions of different dilutions.
Figure 3:
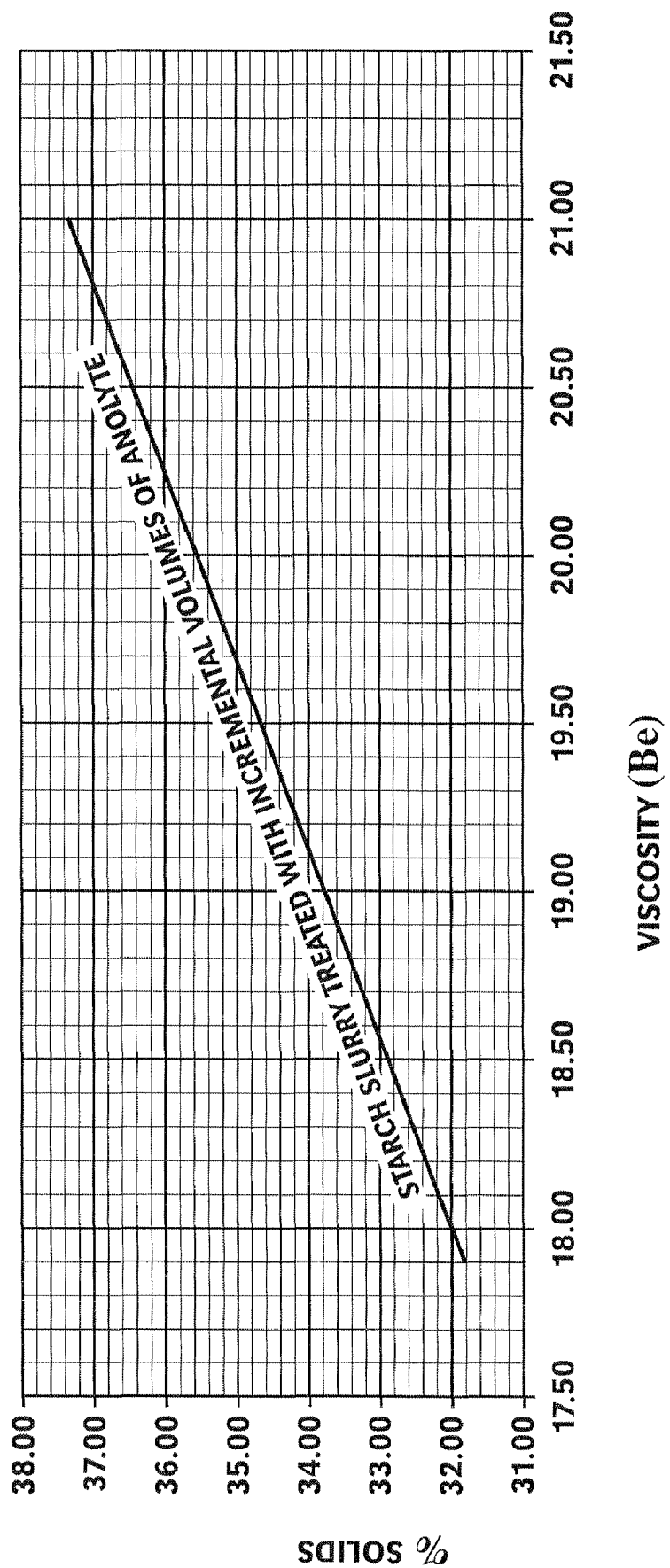
FIG. 3 is a chart showing changes in the viscosity of a starch slurry treated with incremental volumes of anolyte in Example 4 versus the resulting change in the percentage of solids.

FIG. 2 shows that progressive linear dilutions of Anolyte with tap water (S1 and S2) resulted in a non-linear change of the ORP. This disparate relationship is attributed to the buffering capacity of the treated water to limit linear attenuations of electrical charge and affords a reliable measure of predictability of ORP when the anolyte solution has been diluted in water media of different quality.

A commercial strain of Bacillus subtilis was grown on recognized standard culture media and was diluted to the final numerical count using half strength Ringers solution. Anolyte was generated to the specifications as detailed above and diluted in tap water in a non-linear dilution series. Fixed aliquats of microbes (*B. subtilis*) at predetermined bioload strengths were exposed to the various anolyte dilutions as detailed below.

TABLE 7

Correlation between microbial growth as a function of different microbial bioload challenges and anolyte diluted in a non-linear series. (Test micro-organism: *Bacillus subtilis*)

| ORP (mV) | Anolyte concentration | Microbial count - cfu/ml | | | | |
|---|---|---|---|---|---|---|
| | | $10^6$ | $10^5$ | $10^4$ | $10^3$ | $10^2$ |
| 958 | Neat | No growth | No growth | No growth | No growth | No growth |
| 842 | 1:10 | No growth | No growth | No growth | No growth | No growth |
| 784 | 1:50 | Growth | Growth | No growth | No growth | No growth |
| 468 | 1:100 | Growth | Growth | No growth | No growth | No growth |
| 386 | 1:1000 | Growth | Growth | Growth | Growth | Growth |
| 377 | 1:10 000 | Growth | Growth | Growth | Growth | Growth |

Legend -
cfu/ml—colony forming units per milliliter of final solution

Conclusion:

Exposure of fixed aliquats of solutions with known microbe numbers to anolyte solutions of different strengths resulted in a reliable correlation between anolyte dilution and microbial viability. There was a direct correlation between the measure of microbial viability and the ORP measurement at the equivalent dilution series as detailed in FIG. 2 and it is thus suggested that ORP is a reliable indicator of microbial viability at different levels of bioload.

EXAMPLE 5

Changes Associated with Incremental Dosing of Anolyte into the Wash Starch Tank at an Industrial Starch Mill Incremental volumetric dosing of anolyte solutions into the mill starch slurry was undertaken to establish the impact on the physicochemical characteristics of the treated starch. (Food And Pharmaceutical Grade White Corn Starches at 21Be')

TABLE 8

Changes in physiochemical parameters of starch slurry when dosed with incremental volumes of anolyte.

| DB (kg/h) Into wash starch tank | Slurry Viscosity (Be) Into wash starch tank | Slurry in (kg/h) | Anolyte Added (liter/h) | Slurry out (kg/h) | Viscosity (Be) out | % Solids |
|---|---|---|---|---|---|---|
| 4522 | 21.0 | 12117.8 | 0 | 12117.9 | 21.0 | 37.320 |
| 4522 | 21.0 | 12117.8 | 100 | 12217.8 | 20.8 | 37.016 |
| 4522 | 21.0 | 12117.8 | 200 | 12317.8 | 20.7 | 36.716 |
| 4522 | 21.0 | 12117.8 | 300 | 12417.8 | 20.5 | 36.420 |
| 4522 | 21.0 | 12117.8 | 400 | 12517.8 | 20.3 | 36.129 |
| 4522 | 21.0 | 12117.8 | 500 | 12617.8 | 20.2 | 35.843 |
| 4522 | 21.0 | 12117.8 | 600 | 12717.8 | 20.0 | 35.561 |
| 4522 | 21.0 | 12117.8 | 700 | 12817.8 | 19.9 | 35.283 |
| 4522 | 21.0 | 12117.8 | 800 | 12917.8 | 19.7 | 35.010 |
| 4522 | 21.0 | 12117.8 | 900 | 13017.8 | 19.6 | 34.741 |
| 4522 | 21.0 | 12117.8 | 1000 | 13117.8 | 19.4 | 34.477 |
| 4522 | 21.0 | 12117.8 | 1100 | 13217.8 | 19.3 | 34.216 |
| 4522 | 21.0 | 12117.8 | 1200 | 13317.8 | 19.1 | 33.959 |
| 4522 | 21.0 | 12117.8 | 1300 | 13417.8 | 19.0 | 33.706 |
| 4522 | 21.0 | 12117.8 | 1400 | 13517.8 | 18.8 | 33.456 |
| 4522 | 21.0 | 12117.8 | 1500 | 13617.8 | 18.7 | 33.211 |
| 4522 | 21.0 | 12117.8 | 1600 | 13717.8 | 18.6 | 32.969 |
| 4522 | 21.0 | 12117.8 | 1700 | 13817.8 | 18.4 | 32.730 |
| 4522 | 21.0 | 12117.8 | 1800 | 13917.8 | 18.3 | 32.495 |

Legend:
DB—Dry Basis mass,
Be—'Baume' as an indicator of % solids or specific gravity/density.

Results

The incremental addition of anolyte to mill starch slurry did not have an adverse or uncontrolled impact upon the relationship between the viscosity and specific gravity (SG) of the slurry and the percentile of solids present in the same. Changes in SG and viscosity were recognized to be predictable as a direct result of a dilution effect. Anolyte is thus an effective additive to control microbial contaminants at variable inclusion levels without impacting upon the integrity of the predictive ratios of the ingredient parameters recognized in starch production.

EXAMPLE 6

Changes in the Dextrin Components of a Wheat Starch Flour when Exposed to Different Types of Anolyte at Different Stages of Starch Processing A HPLC (High Pressure Liquid Chromatograph) assay was undertaken to establish the effect on the relative concentrations of various dextrin components of starch polymers after exposing wheat starch at different stages of processing to different types of anolyte.

Commercial white bread flour with a protein content of 11.8% was obtained from a wheat mill and was used as an ingredient in the standard Chorleywood white bread recipe. The water component of the recipe ($\leqq 40\%$ by mass of the dough) was either untreated (Code D), treated with Sodium Bicarbonate Anolyte (S2—Code B) at an inclusion rate of 50 vol. % of total or with Sodium Chloride Anolyte (S1—Code C). Untreated flour (Code A) was included to assess the direct impact of untreated or anolyte treated water upon the relative dextrin concentrations.

Wheat grains were either conditioned with untreated tap water (Code A-D) or tap water with a 35 vol. % of total inclusion of Sodium Chloride Anolyte (S1) (Code E-G). These conditioned grains were then milled in accordance with standard commercial milling practices and the flour was submitted as an ingredient to the standard Chorleywood white bread recipe. Anolyte was added to the water component of the bake mix as either 50% of volume (S2) or 35% by volume for S1.

TABLE 9

Fermentable sugar concentration of wheat starch after exposure to two types of anolyte solution

| Code | Treatment type | Xylose | Fructose | Sucrose | Glucose |
|------|----------------|--------|----------|---------|---------|
|      |                | µg/g   |          |         |         |
| A | Mill flour | 0.00 | 6248.30 | 7959.65 | 2540.30 |
| B | Mill flour + 50% S2 dough | 8309.90 | 5277.85 | 0.00 | 14751.95 |
| C | Mill flour + 35% S1 dough | 35075.90 | 5046.60 | 0.00 | 15610.05 |
| D | Mill flour + Tap water dough | 0.00 | 0.00 | 0.00 | 3578.10 |
| E | 35% S1 conditioned grain | 0.00 | 5801.10 | 8811.65 | 2630.70 |
| F | 35% S1 conditioned grain + 50% S2 dough | 11062.45 | 5147.90 | 0.00 | 23137.75 |
| G | 35% S1 conditioned grain + Tap Water dough | 31657.40 | 5039.45 | 0.00 | 17547.65 |

Legend:
µg/g—micro grams per gram.

Results:

It is readily apparent that inclusion of anolyte into the mill flour dough mixture results in a substantial increase in the amount of Xylose that is produced, and that the sodium chloride anolyte when added to the mill flour was more effective in the generation of Xylose than was anolyte generated with Sodium Bicarbonate. Additionally it was conclusively demonstrated that the inclusion of the oxidant anolyte solutions in the dough mix resulted in the breakdown of the sucrose component of the dough mix into its constituent Fructose and Glucose molecules (B, C, F & G). In contrast to using flour conditioned with Tap water (A-D), the conditioning of the grain with 35% S1 Anolyte resulted in a substantial increase in Xylose concentration, even when the flour from the anolyte conditioned grain was mixed with tap water (G). Additionally, dry flour derived anolyte conditioned grains, when subjected to HPLC analysis also revealed a significant increase in glucose and fructose sugars, thus substantiating the assertion that anolyte when applied as a conditioning solution or as an ingredient of a dough mix does have the distinctive capability above and beyond that of tap water to modify the profile of fermentable sugars generated during the grain milling and dough production processes.

Additionally, the increased concentrations of Xylose generated from starch polymers after exposure to anolyte, supports the contention that the enhanced positive oxidation reduction potential (ORP) of Anolyte has the capacity to cleave the relatively highly energized covalent bonds between adjacent carbon molecules, in addition to being able to disrupt the hydrogen bonding between the starch polymers normally attributed to an untreated water ingredient.

EXAMPLE 7

Application of Anolyte as a Means to Synchronize the Germination of Barley Seeds in the Malting Process for Beer Production Commercial barley grains used in the standard malting process were steeped in a variety of solution permutations comprising tap water and anolyte or catholyte and anolyte, and tap water for a 24 hour period. Thirty grains were allocated to each treatment group. The anolyte solution was generated at an ORP of ≧900 mV, a Free Active Oxidant concentration of ≦300 ppm and a pH=6.5, while the catholyte had a negative ORP of more than or equal to −900 mV (preferably an ORP in the range of −900 mV and −1000 mV) and a pH of ≧10.

The concentration of the anolyte used in the aqueous anolyte steeping solution was 50% by volume. In general, the anolyte will preferably be present in the aqueous anolyte steeping solution in an amount in the range of from about 30% to about 100% by volume.

The concentration of the catholyte used in the aqueous catholyte steeping solution was 60% by volume. In general, the catholyte will preferably be present in the aqueous catholyte steeping solution in an amount in the range of from about 40% to about 100% by volume.

The grains of group A were treated with tap water for 24 hours and then irrigated with tap water for 2 days. The grains in group B were soaked in anolyte for 24 hours and then irrigated in anolyte for a further 2 days. Group C were treated with anolyte for 5 hours, Catholyte for 19 hours and then irrigated with tap water for 2 days and finally, group D was irrigated in anolyte for 24 hours with a further 48 hour irrigation with tap water. The grains from each treatment group were evaluated for the measure of consistency of stage of germination after a three day period. At day 7, all root lengths were measured and equated to the root length measures of the germinated grains in the tap water control group (A)

TABLE 10

Changes in germination viability of barley grains after exposure to Tap Water, Anolyte, Anolyte and Catholyte and Anolyte and Tap water.

| Group | Treatment solution | Irrigation solution | Viability (%) | Root length vs control |
|-------|-------------------|---------------------|---------------|------------------------|
| A (Control) | Tap Water | Tap water | 80 | — |
| B | Anolyte | Anolyte | 3.3 | −20% |
| C | Anolyte + Catholyte | Tap Water | 100 | +58% |
| D | Anolyte | Tap water | 96.7 | +6.7% |

Optimal germination was obtained with a combination of anolyte exposure of 5 hours, catholyte exposure for 19 hours, and tap water irrigation for 48 hours. Excessive exposure of the grains to anolyte resulted in a substantially reduced viability, while exposure to anolyte with subsequent tap water irrigation yielded less significant increases relative to the tap water control grains.

Strategic application of anolyte and catholyte during the first 24 hours of treatment of germinating wheat grains yields a reduced duration to germination, an increased rate of germination, and a greater percentage of viability.

CONCLUSION

The anolyte solution of the invention provides an added benefit in that, in addition to its broad based antimicrobial efficacy, it is able simultaneously to sanitize steeping equipment, such as screw conveyors and hydrators, as well as downstream processing and milling equipment—a simultaneous "in-process" plant and product disinfectant, as it were.

Additionally, we have discovered and shown that ORP is a reliable measure of potential antimicrobial efficacy of the anolyte solutions at different dilution rates and that with a prior knowledge of the extent of microbial bioload (cfu/ml) in a system, the anolyte solution required to eliminate microbial contamination can be accurately titrated on the basis of this relationship.

We have also demonstrated that the elevated ORP's of the electrochemically activated anolyte and catholyte solutions have the capacity to selectively manipulate the starch polymer aggregates and mono-molecules of starch derivatives into highly specific and differentiated molecular configurations of distinctive economic and performance criteria.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. A method of extracting starch from a starch source comprising the steps of:
   (a) steeping said starch source in a steeping liquid,
   (b) after step (a), grinding said starch source to produce a ground starch source material, and then
   (c) extracting an extracted starch product from an intermediate product slurry comprising at least a portion of said ground starch source material,
   said steeping liquid comprising an aqueous anolyte product having a pH in the range of from about 4.5 to about 7.5 and a positive oxidation-reduction potential of at least $^+$650 mV,
   said steeping liquid further comprising non-electrochemically activated water, and
   said aqueous anolyte product being present in said steeping liquid in an amount in the range of from about 1% to about 50% by volume.

2. The method of claim 1 wherein said starch source is: barley grain; wheat grain; maize grain; rye grain; oat grain; corn kernels; other cereal crop grain; or a combination thereof.

3. The method of claim 1 wherein:
   said portion of said ground starch source material comprises starch and gluten;
   step (c) comprises at least partially separating said starch and said gluten; and
   said method further comprises the step of adding to said intermediate product slurry, at least one location, an aqueous anolyte product having a pH of at least 6.0 and a positive oxidation-reduction potential of at least $^+$900 mV to produce a treated intermediate slurry.

4. The method of claim 3 wherein said aqueous anolyte product having a pH of at least 6.0 and a positive oxidation-reduction potential of at least $^+$900 mV is added to said intermediate product slurry in a total amount effective to comprise from about 1% to about 20% by volume of said treated intermediate slurry.

5. The method of claim 1 wherein:
   said portion of said ground starch source material comprises starch and gluten;
   step (c) comprises at least partially separating said starch and said gluten to produce a starch product slurry comprising said extracted starch product; and
   said method further comprises the step of adding an aqueous anolyte product having a pH of at least 6.0 and a positive oxidation-reduction potential of at least $^+$900 mV to said intermediate product slurry, or to said starch product slurry, or to both of said intermediate product slurry and said starch product slurry, in a manner effective to cause said aqueous anolyte product having a pH of at least 6.0 and a positive oxidation-reduction potential of at least $^+$900 mV to be present in said starch product slurry at a final concentration in the range of from about 1% to about 35% by volume.

6. The method of claim 1 further comprising the step, after step (c), of (d) bleaching said extracted starch product by contacting said extracted starch product with an aqueous anolyte product having, when in undiluted form, a pH in the range of from about 2 to about 5 and a positive oxidation-reduction potential of at least $^+$1000 mV.

7. The method of claim 1 further comprising the step, prior to step (a), of contacting said starch source with an aqueous catholyte product having, when in undiluted form, a pH in the range of from about 8 to about 13 and a negative oxidation-reduction potential of at least $^-$700 mV.

8. A method of extracting starch from a starch source comprising the steps of:
   (a) steeping said starch source;
   (b) after step (a), grinding said starch source to produce a starch source material and forming an intermediate product slurry comprising at least a portion of said ground starch source material, wherein said portion of said ground starch material comprises starch and gluten; and
   (c) after step (b), at least partially separating said starch and said gluten to produce a starch product slurry comprising an extracted starch product,
   wherein said method further comprises adding an aqueous anolyte product to said intermediate product slurry to produce a treated intermediate product slurry, said aqueous anolyte product having, when in undiluted form, a pH in the range of from about 4.5 to about 7.5 and a positive oxidation-reduction potential of at least $^+$650 mV.

9. The method of claim 8 wherein said starch source is: barley grain; wheat grain; maize grain; rye grain; oat grain; corn kernels; other cereal crop grain; or a combination thereof.

10. The method of claim 8 further comprising treating said starch source with sulfur dioxide in step (a).

11. The method of claim 8 further comprising adding to said starch product slurry an aqueous anolyte product having a pH in the range of from about 4.5 to about 7.5 and a positive oxidation-reduction potential of at least $^+$650 mV.

12. The method of claim 8 wherein:
   said aqueous anolyte product, when in undiluted form, has a pH of at least 6.0 and a positive oxidation-reduction potential of at least +900 mV and
   said aqueous anolyte product is added to said intermediate product slurry in a total amount effective to cause said aqueous anolyte product to be present in said treated intermediate product slurry at a concentration in the range of from about 1% to about 20% by volume.

13. The method of claim 8 further comprising the step, after step (c), of bleaching said extracted starch product by contacting said extracted starch product with an aqueous anolyte product having, when in undiluted form, a pH in the range of from about 2 to about 5 and a positive oxidation-reduction potential of at least $^+1000$ mV.

14. The method of claim 8 further comprising the step, prior to step (a), of contacting said starch source with an aqueous catholyte product having, when in undiluted form, a pH in the range of from about 8 to about 13 and a negative oxidation-reduction potential of at least $^-700$ mV.

15. A method of extracting starch from a starch source comprising the steps of:
   (a) steeping said starch source;
   (b) after step (a), grinding said starch source to produce a ground starch source material and forming an intermediate product slurry comprising at least a portion of said ground starch source material, wherein said portion of said starch material comprises starch and gluten; and
   (c) after step (b), at least partially separating said starch and said gluten to produce a starch product slurry comprising an extracted starch product,
   wherein said method further comprises adding an aqueous anolyte product to said starch product slurry to produce a treated starch slurry, said aqueous anolyte product having, when in undiluted form, a pH in the range of from about 4.5 to about 7.5 and a positive oxidation-reduction potential of at least $^+650$ mV.

16. The method of claim 15, wherein said starch source is: barley grain; wheat grain; maize grain; oat grain; corn kernels; other cereal crop grain; or a combination thereof.

17. The method of claim 15 further comprising treating said starch source with sulfur dioxide in step (a).

18. The method of claim 15 further comprising the step, after step (c), of bleaching said extracted starch product by contacting said extracted starch product with an aqueous anolyte product having, when in undiluted form, a pH in the range of from about 2 to about 5 and a positive oxidation-reduction potential of at least $^+1000$ mV.

19. The method of claim 15 further comprising the step, prior to step (a), of contacting said starch source with an aqueous catholyte product having, when in undiluted form, a pH in the range of from about 8 to about 13 and a negative oxidation-reduction potential of at least $^-700$ mV.

* * * * *

UNITED STATES PATENT AND TRADEMARK OFFICE
CERTIFICATE OF CORRECTION

PATENT NO. : 8,123,865 B2  
APPLICATION NO. : 12/050501  
DATED : February 28, 2012  
INVENTOR(S) : Kirkpatrick et al.

Page 1 of 1

It is certified that error appears in the above-identified patent and that said Letters Patent is hereby corrected as shown below:

On the title page, item (73) Assignee is corrected to read:

GIANT TRADING INC. (PA)

Signed and Sealed this
Twenty-ninth Day of January, 2013

David J. Kappos
*Director of the United States Patent and Trademark Office*